United States Patent
Bovis

(10) Patent No.: US 11,059,951 B2
(45) Date of Patent: Jul. 13, 2021

(54) METHOD FOR POLYCONDENSATION OF RECYCLED PET

(71) Applicant: GAMMA MECCANICA S.P.A., Bibbiano (IT)

(72) Inventor: Paolo Bovis, Reggio Emilia (IT)

(73) Assignee: GAMMA MECCANICA S.P.A., Bibbiano (IT)

( * ) Notice: Subject to any disclaimer, the term of this patent is extended or adjusted under 35 U.S.C. 154(b) by 0 days.

(21) Appl. No.: 16/484,005

(22) PCT Filed: Feb. 1, 2018

(86) PCT No.: PCT/EP2018/052570
§ 371 (c)(1),
(2) Date: Aug. 6, 2019

(87) PCT Pub. No.: WO2018/141871
PCT Pub. Date: Aug. 9, 2018

(65) Prior Publication Data
US 2019/0382551 A1 Dec. 19, 2019

(30) Foreign Application Priority Data

Feb. 6, 2017 (IT) .................... 102017000012290

(51) Int. Cl.
| | |
|---|---|
| *C08J 11/04* | (2006.01) |
| *B29B 13/02* | (2006.01) |
| *B29B 13/08* | (2006.01) |
| *C08G 63/183* | (2006.01) |
| *B29B 13/00* | (2006.01) |
| *B29K 67/00* | (2006.01) |
| *B29K 105/26* | (2006.01) |

(52) U.S. Cl.
CPC .............. *C08J 11/04* (2013.01); *B29B 13/02* (2013.01); *B29B 13/08* (2013.01); *C08G 63/183* (2013.01); *B29B 2013/005* (2013.01); *B29K 2067/003* (2013.01); *B29K 2105/26* (2013.01); *C08J 2367/02* (2013.01)

(58) Field of Classification Search
USPC .................................... 521/48; 528/271, 272
See application file for complete search history.

(56) References Cited

U.S. PATENT DOCUMENTS

| | | | |
|---|---|---|---|
| 7,897,651 B2 * | 3/2011 | Ikenaga | C08J 11/24 |
| | | | 521/48.5 |
| 2007/0255036 A1 | 11/2007 | Christel et al. | |

FOREIGN PATENT DOCUMENTS

DE    102014104955 A1    10/2015

OTHER PUBLICATIONS

International Search Report dated Mar. 29, 2018 re: Application No. PCT/EP2018/052570, pp. 1-3.
Written Opinion dated Mar. 29, 2018 re: Application No. PCT/EP2018/052570, pp. 1-4.
EP Examination Report dated Feb. 15, 2021 re: Application No. 18 701 504.5, pp. 1-4, citing: D1.

* cited by examiner

*Primary Examiner* — Terressa Boykin
(74) *Attorney, Agent, or Firm* — Cantor Colburn LLP

(57) ABSTRACT

A method for the polycondensation of recycled PET includes the steps of
introducing a mass of recycled PET in a reaction chamber,
applying heat to the mass of recycled PET introduced in the reaction chamber in order to reach a working temperature and maintain it for a treatment time, and
moving the mass of recycled PET during at least part of the heat application step. The method further includes the step of
applying vacuum to the reaction chamber during at least part of the heat application step. The heat application occurs by dielectric microwave heating of the mass of recycled PET.

9 Claims, No Drawings

METHOD FOR POLYCONDENSATION OF RECYCLED PET

TECHNICAL FIELD

The present disclosure relates to a method for the polycondensation of recycled PET (polyethylene terephthalate).

BACKGROUND

In the cycle for the processing of PET obtained from recycled material it is known to provide a polycondensation step in order to obtain an increase in intrinsic viscosity (IV) such as to give the recycled material rheological and mechanical strength properties that are equivalent to those of the virgin material, in order to expand the fields of its possible use.

As is known, this method induces the molecular chains of PET to aggregate and therefore lengthen, consequently increasing the molecular weight of the material and optimizing the mechanical performance correlated therewith. During the execution of this method the reaction undergone by the material causes the release of secondary compounds which must be removed, such as for example water and ethylene glycol.

This polycondensation method can be performed on material in the liquid state (LSP—Liquid State Polycondensation) or in the solid state (SSP—Solid State Polycondensation).

The LSP method provides for maintaining a mass of PET melted by extrusion inside a reaction chamber in vacuum which is appropriately heated to a temperature that is higher than the melting point of the material for a certain time, keeping it stirred mechanically.

The vacuum applied to the reaction chamber allows the evacuation of the secondary reaction products.

The heating of the material inside the chamber and the keeping thereof at the predefined temperature generally occurs by conduction, by heating the walls of the chamber.

However, these heating systems entail high energy consumptions which affect negatively the industrial costs of the processing cycle and consequently the final cost of the resulting material.

The SSP method is instead generally performed on material in flakes or granules and relates to introducing the material in a reaction chamber in which it is heated and kept at a controlled temperature that is lower than the corresponding melting point, while the secondary reaction products are extracted from said chamber.

It is known to perform this SSP method by means of various heating systems.

For example, it is known to use systems for heating by conduction through the walls of the reaction chamber or by injection of gaseous substances into the chamber itself.

However, these systems are scarcely energy efficient, since the heat exchange is based on the difference in temperature between the heating medium (wall or gas) and the material and the temperature of the medium itself must be kept below the melting point of the material to avoid causing unwanted melting or agglomerations thereof.

Furthermore, if heated gaseous substances are used, it is necessary to provide appropriate systems for their purification at the outlet from the reaction chamber before they are returned to circulation.

As an alternative, it is known to use systems for heating by friction which provide for mechanical agitation of the material inside the reaction chamber, so that it is heated by colliding with the corresponding walls and rubbing against them. However, these systems do not allow effective control of the temperature of the material during the process, have several technical difficulties in the provision of mechanical apparatuses for the agitation of the material and entail the forming of considerable quantities of dust which must be managed by means of appropriate air filtration systems.

Moreover, heating systems are known which use infrared lamps arranged inside the reaction chamber kept in vacuum.

However, the infrared radiation tends to heat the mass of material only at the surface, and therefore it is necessary to provide appropriate systems for the continuous movement of the material so as to render its temperature uniform.

Therefore, this system too entails the forming of dust, albeit in a smaller quantity than friction heating systems, which must be in any case managed and soil the infrared lamps, reducing their efficiency.

Besides, the amount of absorbed energy is influenced by the color of the material and therefore infrared devices have an efficiency that varies as a function of the color characteristics of the material to be processed.

In general, these heating systems of the known type are not free from drawbacks, which include the fact that they entail high energy consumptions and are scarcely efficient, since the heat sources that are used act unevenly on the material and in order to avoid the risk of triggering the melting of some portions thereof it is necessary to limit the working temperature, increasing the time required for the treatment and reducing its efficiency.

SUMMARY

The aim of the present disclosure is to eliminate the drawbacks cited above of the background art by providing a method for the polycondensation of recycled PET that allows to optimize the heating of the material, reducing the duration of the treatment and the corresponding energy consumptions so as to increase its efficiency significantly.

Within this aim, the present disclosure is applicable both to material in the liquid state (LSP) and to material in the solid state (SSP).

The present disclosure contains the forming of dust during the execution of the treatment.

The present disclosure is relatively easy to perform in practice, safe in use, effective in operation, and relatively modest in cost.

This aim and these and other advantages which will become better apparent hereinafter are all achieved by providing a method for polycondensation of recycled PET according to claim 1, optionally in combination with one or more of the characteristics of the dependent claims The method for polycondensation of recycled PET according to the disclosure comprises the following steps:
  introducing a mass of recycled PET in a reaction chamber,
  applying heat to the mass of recycled PET inside the reaction chamber until a working temperature is reached and maintaining said temperature for a treatment time,
  moving the mass of recycled PET during at least part of the heat application step; and
  applying vacuum to the reaction chamber during at least part of the heat application step.

DETAILED DESCRIPTION OF THE DISCLOSURE

Heat application occurs by dielectric microwave heating of the mass of recycled PET and provides for the use of at least one microwave source with variable or fixed power. The at least one source can in fact operate both in continuous wave mode and in a pulsed mode, depending on whether it is preferable to obtain a constant heating or high-power pulses for short times. As an alternative, the microwave sources can be in the solid state, capable of operating within the allowed IMS frequencies, but can have a variable frequency, so as to obtain impedance matching by frequency variation.

Advantageously, it has been observed that dielectric microwave heating achieves deep heating of the material, facilitating the obtainment of a substantially uniform temperature thereof. Furthermore, the use of microwaves facilitates the evaporation of the secondary reaction products that one wishes to evacuate, such as water, ethylene glycol and other pollutants, allowing the obtainment of a material suitable for use even in contact with foods. Essentially, by means of the execution of the method according to the disclosure one achieves also the effect of a so-called "super-cleaning" treatment of the recycled PET.

Advantageously, the method according to the disclosure can be performed both on recycled PET in the liquid state (LSP), or processed by extrusion, and on PET in the solid state, typically in flakes or granules.

If the method according to the disclosure is performed on PET in the liquid state, the working temperature is higher than the melting point of the material and is therefore generally higher than 265° C.

If instead the method according to the disclosure is performed on recycled PET in the solid state, the working temperature is comprised between the glass transition temperature and the temperature of the material and therefore is generally comprised between 60° C. and 265° C. Preferably, the working temperature is in any case higher than 100° C. and as close as possible to the melting point of the material in order to increase the efficiency of the treatment.

The microwaves used for heat application have a frequency comprised between 0.4 GHz and 300 GHz.

Furthermore, the degree of vacuum applied to the reaction chamber is comprised between 1 mbar and 700 mbar absolute and between 10 and 700 millibar absolute if inert gas is injected into the reaction chamber in order to create a protective atmosphere in the chamber itself.

Vacuum can be applied to the reaction chamber throughout the heat application step or at least starting from the reaching of a preset temperature of the material (on the order of 140° C.) at which the reaction proceeds at a certain rate. Application of vacuum is in any case useful also in the initial step of heat application in order to facilitate the evacuation of the secondary reaction products.

The mixing action allows to ensure the obtainment of a uniform temperature of the treated material. This mixing can occur continuously or intermittently when the microwave source or sources are switched on. Mixing can occur by means of mechanical devices arranged inside the reaction chamber or by means of the movement of the chamber itself.

It is noted that since dielectric microwave heating is a volumetric treatment, not a superficial one, the mixing action that is required to render uniform the exposure of the material to the radiation and therefore the temperature reached by it is much less intense than in the case of infrared heating. In this manner the forming of dust during the mixing of the material is reduced drastically.

Preferably, the mixing of the material occurs at such a rate as to arrange the mass of recycled PET so that its free surface is inclined by an angle of less than 30° with respect to the polarization plane of the microwaves.

Furthermore, the method according to the disclosure comprises detecting the temperature of the recycled PET mass during the application of heat by means of sensors arranged in the reaction chamber and detecting the power reflected by the material by means of adapted devices located in the chamber itself, optionally paired with the microwave source(s), in order to act on the adjustment of the intensity of the electrical field of the microwaves as a function of the detected temperature and of the power reflected by the material. In particular when the temperature of the material approaches the melting point, the intensity of the electrical field of the microwaves must be reduced or even brought to zero so as to avoid triggering the melting of the material.

Moreover, the reduction of the detected reflected power also must entail a reduction of the intensity of the electrical field of the microwaves, since it means that the material has reached such a temperature that its dielectric properties have been modified and is capable of absorbing the energy of the electrical field more efficiently. This reduction is necessary to avoid triggering the melting of the material or to prevent the high reflected power from facilitating the onset of electrical discharge phenomena.

This adjustment can occur in a predictive manner if prior to the execution of the treatment, a curve related to the trend of the variation of the reflected power as a function of the temperature of the material is created by means of laboratory tests. In this case, during the execution of the treatment, the intensity of the electrical field is decreased following the curve cited above, so as to reach the desired temperature of the material in the shortest possible time and with the lowest energy consumption.

This adjustment can also be set by means of a feedback control, i.e., once the temperature value to be reached has been set the intensity of the electrical field can be reduced with a PID logic or with steps of preset value or with other known logic systems for temperature control, as the temperature of the material approaches the desired value, so as to avoid overheating the material due to the thermal inertia of the heated mass and so as to optimize the efficiency of energy and heat transfer in the material (which increases as the temperature thereof rises).

The adjustment of the intensity of the electrical field of the microwaves is therefore performed on the basis of the detected values of the temperature of the material and of the reflected power.

The value of the temperature of the material is predominant, since it influences directly the outcome of the process in terms of speed of execution and quality of the resulting material. The extent of the reflected power is correlated with the efficiency of the method. If the power supplied by the source is known and the reflected power is measured, it is possible to determine by subtraction the power absorbed by the material, which varies as a function of the temperature of the material itself.

Therefore, as the reflected power decreases, if the power that must be absorbed by the material during heating is known, it is possible to reduce accordingly the supplied power, with a considerable energy saving.

As the temperature of the material approaches the preset working temperature, the supplied power must therefore be decreased according to the control logic systems described above.

Therefore, the intensity of the electrical field of the microwaves must be determined by considering the following relation:

$$E = K_1 \times (T_L - T_M) + K_2 \times E_r$$

where E is the energy that must be supplied by the source; $T_L$ is the preset working temperature; $T_M$ is the measured temperature of the material; $E_r$ is the power reflected by the material and $K_1$ and $K_2$ are two coefficients which are determined by the user on the basis of experimental tests and depend mainly on the characteristics of the material, on the geometry and on the dimensions of the reaction chamber, and on the configuration of the electrical field.

Moreover, the method according to the disclosure comprises monitoring the occurrence of any ionization phenomena (such as the forming of arcs or plasma) by means of optical sensors located inside the reaction chamber so as to intervene to reduce the intensity of the electrical field of the microwaves if these phenomena are detected, in order to avoid damaging the material. In this case, the electrical field is deactivated for a few seconds (2-3 seconds), so that the plasma recombines and the electric arc is no longer sustained. The electrical field is thus reactivated, but with a lower intensity than the one used previously (normally it is reduced by 5-10%). This procedure is repeated at each detection made by the optical sensors so as to limit the intensity of the electrical field.

It is noted that the method according to the disclosure can be performed continuously or intermittently. Furthermore, the reaction chamber can have different shapes and dimensions depending on the requirements of the specific application.

In practice it has been found that the described disclosure achieves the proposed aim and advantages and in particular the fact is stressed that the method according to the disclosure allows to minimize the energy consumption required for the execution of the treatment with an appropriate control of the process parameters.

Furthermore, the method according to the disclosure allows to suppress the forming of dust caused by the movement of the material.

Moreover, the method according to the disclosure allows the treatment of recycled PET both in the solid state and in the liquid state.

The disclosure thus conceived is susceptible of numerous modifications and variations, all of which are within the scope of the appended claims.

All the details may furthermore be replaced with other technically equivalent elements.

In practice, the materials used, as well as the contingent shapes and dimensions, may be any according to the requirements without thereby abandoning the protective scope of the claims that follow.

The disclosures in Italian Patent Application No. 102017000012290 (UA2017A000711) from which this application claims priority are incorporated herein by reference.

The invention claimed is:

1. A method for polycondensation of recycled PET, the method including the following steps:
   introducing a mass of recycled PET in a reaction chamber,
   applying heat to said mass of recycled PET inside said reaction chamber in order to reach a working temperature and maintain the working temperature for a treatment time,
   mixing said mass of recycled PET during at least part of said heat application, and
   applying vacuum to said reaction chamber during at least part of said heat application,
   wherein said heat application occurs by dielectric microwave heating of said mass of recycled PET.

2. The method according to claim 1, wherein said mass of recycled PET is in a liquid state and wherein said working temperature is higher than the melting point of PET.

3. The method according to claim 1, wherein said mass of recycled PET is in a solid state and said working temperature is comprised between the glass transition temperature of PET and the melting point of PET.

4. The method according to claim 1, wherein said working temperature is close to and below the melting point of PET.

5. The method according to claim 1, wherein said microwave heating has a frequency comprised between 0.4 GHz and 300 GHz.

6. The method according to claim 1, wherein said vacuum application includes keeping said reaction chamber at pressures comprised between 1 mbar and 700 mbar absolute.

7. The method according to claim 1, wherein said mixing occurs at a speed so as to arrange said mass of recycled PET so that the free surface has an angle of less than 30° with respect to the polarization plane of said microwaves.

8. The method according to claim 1, further comprising the step of detecting the temperature of said mass of recycled PET and the power reflected by said material inside said chamber during said application of heat for the adjustment of the intensity of the electrical field of said microwaves as a function of the detected values.

9. The method according to claim 1, further comprising the step of monitoring the occurrence of ionization phenomena inside said reaction chamber to control the intensity of the electrical field of said microwave heating in case of detection of said phenomena.

* * * * *